US012767224B2

(12) United States Patent
Iimura et al.

(10) Patent No.: US 12,767,224 B2
(45) Date of Patent: Oct. 20, 2026

(54) CALIBRATION METHOD FOR MOVING BODY

(71) Applicant: Honda Motor Co., Ltd., Tokyo (JP)

(72) Inventors: Taiki Iimura, Saitama (JP); Kazumasa Ozaki, Saitama (JP); Shinichiro Kobashi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 188 days.

(21) Appl. No.: 18/590,942

(22) Filed: Feb. 29, 2024

(65) Prior Publication Data

US 2024/0326907 A1 Oct. 3, 2024

(30) Foreign Application Priority Data

Mar. 28, 2023 (JP) ................................ 2023-051955

(51) Int. Cl.
*B62D 11/04* (2006.01)
*B60B 19/00* (2006.01)

(52) U.S. Cl.
CPC ............ *B62D 11/04* (2013.01); *B60B 19/003* (2013.01)

(58) Field of Classification Search
CPC .............................. B62D 11/04; B60B 19/003
See application file for complete search history.

(56) References Cited

U.S. PATENT DOCUMENTS

2011/0127093 A1* 6/2011 Koga .................. B62D 11/003 180/6.24
2016/0303900 A1* 10/2016 Yoshino .............. B60B 27/0005

FOREIGN PATENT DOCUMENTS

JP H0996535 A * 4/1997
JP 2018170871 A * 11/2018
JP 2021146748 9/2021
JP 2021174413 A * 11/2021 ............... G08G 1/00
JP 2022160933 A * 10/2022

* cited by examiner

*Primary Examiner* — Hunter B Lonsberry
*Assistant Examiner* — Besufekad Lemma Tessema
(74) *Attorney, Agent, or Firm* — JCIPRNET

(57) ABSTRACT

A calibration method for a moving body, which includes a pair of left and right omnidirectional wheels, includes: a first step of creating a rotational speed command value for four electric motors such that the moving body performs a linear translational movement or an ultra-pivotal turn; a second step of driving each motor based on the command value to move the moving body; a third step of obtaining a total number of rotations of each motor until the movement of the moving body is completed; a fourth step of measuring an yaw angle change amount of the moving body as it moves; a fifth step of repeating the first to fourth steps at least three times to obtain three or more data sets including the total number of rotations of each motor and the yaw angle change amount; and a sixth step of calculating each correction value based on the data sets.

3 Claims, 8 Drawing Sheets

| Correction coefficient | Estimation value | p value |
|---|---|---|
| $\alpha_{rr}$ | 0.95471 | 6.0587e−17 |
| $\alpha_{rl}$ | 0.86404 | 2.3727e−16 |
| $\gamma$ | 0.91896 | 6.8182e−17 |

CALIBRATION METHOD FOR MOVING BODY

CROSS-REFERENCE TO RELATED APPLICATION

This application claims the priority benefits of Japanese application no. 2023-051955, filed on Mar. 28, 2023. The entirety of the above-mentioned patent application is hereby incorporated by reference herein and made a part of this specification.

BACKGROUND

Technical Field

The disclosure relates to a calibration method for moving body having a pair of left and right omnidirectional wheels.

Related Art

Patent Literature 1 discloses a moving body having a pair of left and right omnidirectional wheels. Each of the omnidirectional wheels has a pair of drive disks, an annular main wheel disposed between the pair of drive disks, and a pair of electric motors that rotate each of the drive disks. The main wheel has a circular core body, and multiple driven rollers rotatably supported by the core body and in contact with the pair of drive disks. When the pair of electric motors rotate the corresponding drive disks, the driven roller rotates around its own axis or around the axis of the core body, and the omnidirectional wheels perform translational movement in any direction including front and back and left and right. Further, the moving body turns due to a difference in rotational speed between the left and right omnidirectional wheels.

CITATION LIST

Patent Literature

[Patent Literature 1] JP2021-146748A

In such a moving body, the moving direction of the moving body is determined by four electric motors. Thus, there is a risk that the moving direction of the moving body may deviate depending on individual differences in each electric motor, individual differences in the transmission mechanism from each electric motor to the corresponding drive disk, and the contact state between each drive disk and the main wheel.

In view of the background, it is an object of the disclosure to provide a calibration method for moving body.

SUMMARY

An aspect of the disclosure is a calibration method for a moving body (1) which includes a pair of left and right omnidirectional wheels (3). Each of the omnidirectional wheels includes a pair of drive disks (18), an annular main wheel (19) disposed between the pair of drive disks, and a pair of electric motors (20) that rotate each of the drive disks. The main wheel includes a circular core body (31), and multiple driven rollers (32) rotatably supported by the core body and in contact with the pair of drive disks. The method includes: a first step of creating a rotational speed command value for four of the electric motors such that the moving body performs a linear translational movement or makes an ultra-pivotal turn; a second step of driving each of the electric motors based on the rotational speed command value to move the moving body; a third step of obtaining a total number of rotations of each of the electric motors until the movement of the moving body is completed; a fourth step of measuring a yaw angle change amount of the moving body as the moving body moves; a fifth step of repeating the first to fourth steps at least three times to obtain three or more data sets including the total number of rotations of each of the electric motors and the yaw angle change amount; a sixth step of respectively calculating a correction value, based on the three or more data sets as well as a model that specifies a relationship between the total number of rotations of each of the electric motors, the yaw angle change amount, and a correction value of the rotational speed command value set corresponding to each of the electric motors; and a seventh step of correcting the corresponding rotational speed command value based on the respective correction value.

DESCRIPTION OF THE EMBODIMENTS

Figure 1:
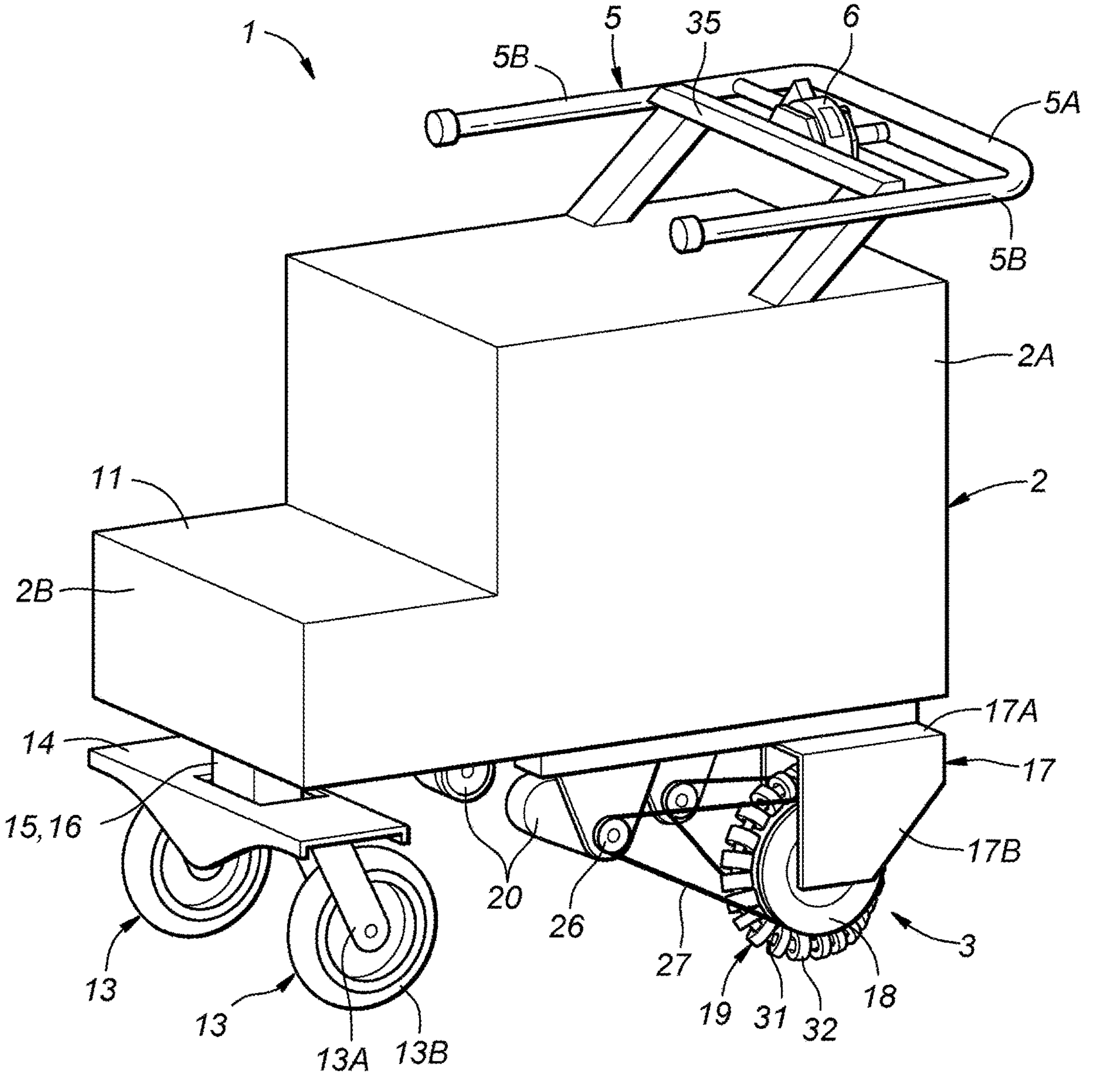
FIG. 1 is a perspective view of a moving body according to an embodiment.

An aspect of the disclosure is a calibration method for a moving body (1) which includes a pair of left and right omnidirectional wheels (3). Each of the omnidirectional wheels includes a pair of drive disks (18), an annular main wheel (19) disposed between the pair of drive disks, and a pair of electric motors (20) that rotate each of the drive disks. The main wheel includes a circular core body (31), and multiple driven rollers (32) rotatably supported by the core body and in contact with the pair of drive disks. The method includes: a first step of creating a rotational speed command value for four of the electric motors such that the moving body performs a linear translational movement or makes an ultra-pivotal turn; a second step of driving each of the electric motors based on the rotational speed command value to move the moving body; a third step of obtaining a total number of rotations of each of the electric motors until the movement of the moving body is completed; a fourth step of measuring a yaw angle change amount of the moving body as the moving body moves; a fifth step of repeating the first to fourth steps at least three times to obtain three or more data sets including the total number of rotations of each of the electric motors and the yaw angle change amount; a sixth step of respectively calculating a correction value, based on the three or more data sets as well as a model that specifies a relationship between the total number of rotations of each of the electric motors, the yaw angle change amount, and a correction value of the rotational speed command value set corresponding to each of the electric motors, the correction value; and a seventh step of correcting the corresponding rotational speed command value based on the respective correction value.

According to this aspect, a correction value corresponding to the rotational speed command value of each electric motor may be obtained, and the corresponding rotational speed command value may be corrected based on the correction value. In this way, a calibration method for moving body is provided.

In the embodiment, the three or more data sets may include the data sets corresponding to at least three patterns of the translational movement with different moving directions, or at least two patterns of the translational movement with different moving directions and the ultra-pivotal turn.

According to this aspect, each correction value may be calculated.

In this aspect, excluding a combination of the electric motors on a same side of the left and right omnidirectional wheels, the correction value corresponding to each of any two of the electric motors is set to a same value.

According to this aspect, each correction value may be calculated.

According to the configuration, a calibration method for moving body is provided.

Hereinafter, a calibration method for moving body according to the disclosure will be described with reference to the drawings. First, the configuration of the moving body will be described. In this embodiment, the moving body functions as a trolley. Below, the direction is determined based on the moving body.

Figure 2:
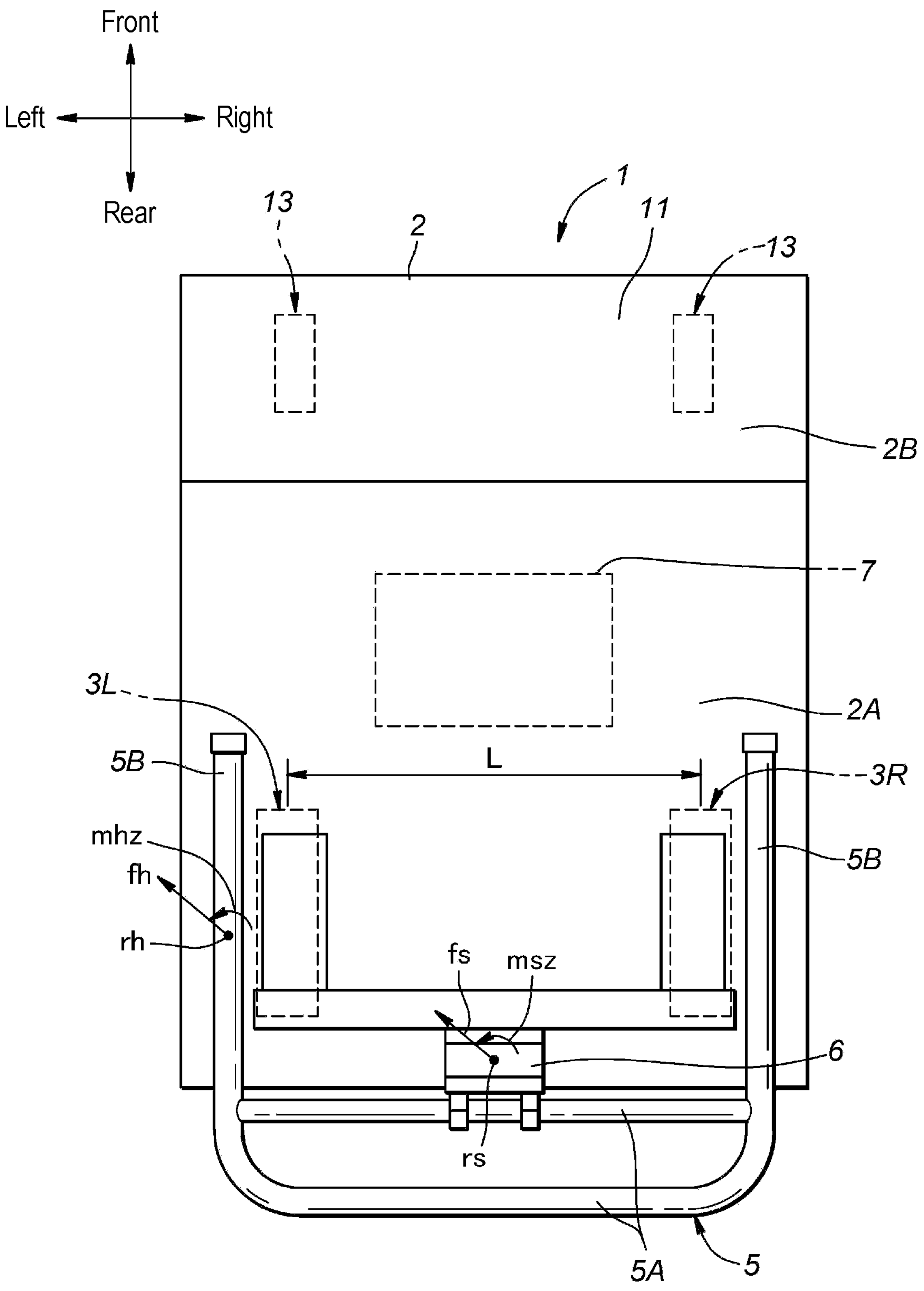
FIG. 2 is a plane view of moving body.

As shown in FIG. 1 and FIG. 2, a moving body 1 includes a vehicle body 2, a pair of left and right pair omnidirectional wheels 3 provided on the vehicle body 2 and moving the vehicle body 2 in all directions along the floor surface, a handle 5 provided on the vehicle body 2 and accepting user operations, a force sensor 6 detecting loads applied to the handle 5, and a control device 7 controlling each of the omnidirectional wheels 3 based on respective loads detected by the force sensor 6.

The vehicle body 2 extends to the front and back. A rear part 2A of the vehicle body 2 extends upwardly than a front part 2B. A support stand 11 for supporting other devices is provided at the front part 2B of the vehicle body 2. The devices supported by the support stand 11 include, for example, inspection equipment such as an X-ray scanner. The device may be fastened to the support stand 11. The control device 7, a battery, and various sensors are preferably provided inside the rear part 2A of the vehicle body 2.

In this embodiment, the pair of omnidirectional wheels 3 are provided at a lower part of the rear part 2A of the vehicle body 2. Further, left and right casters 13 are supported at a lower part of the front part 2B of the vehicle body 2 via a suspension. The suspension includes an arm 14 that is disposed below the vehicle body 2 and extends left and right, and a spring 15 and a shock absorber 16 that are disposed between the vehicle body 2 and the arm 14. The casters 13 are respectively disposed below a left end and a right end of the arm 14. Each of the casters 13 has a fork 13A rotatably coupled to the arm 14 around an axis extending vertically, and a wheel 13B rotatably supported by the fork 13A around an axis extending horizontally. The fork 13A rotates freely relative to the arm 14, and the wheel 13B freely rotates relative to the fork 13A.

Figure 3:
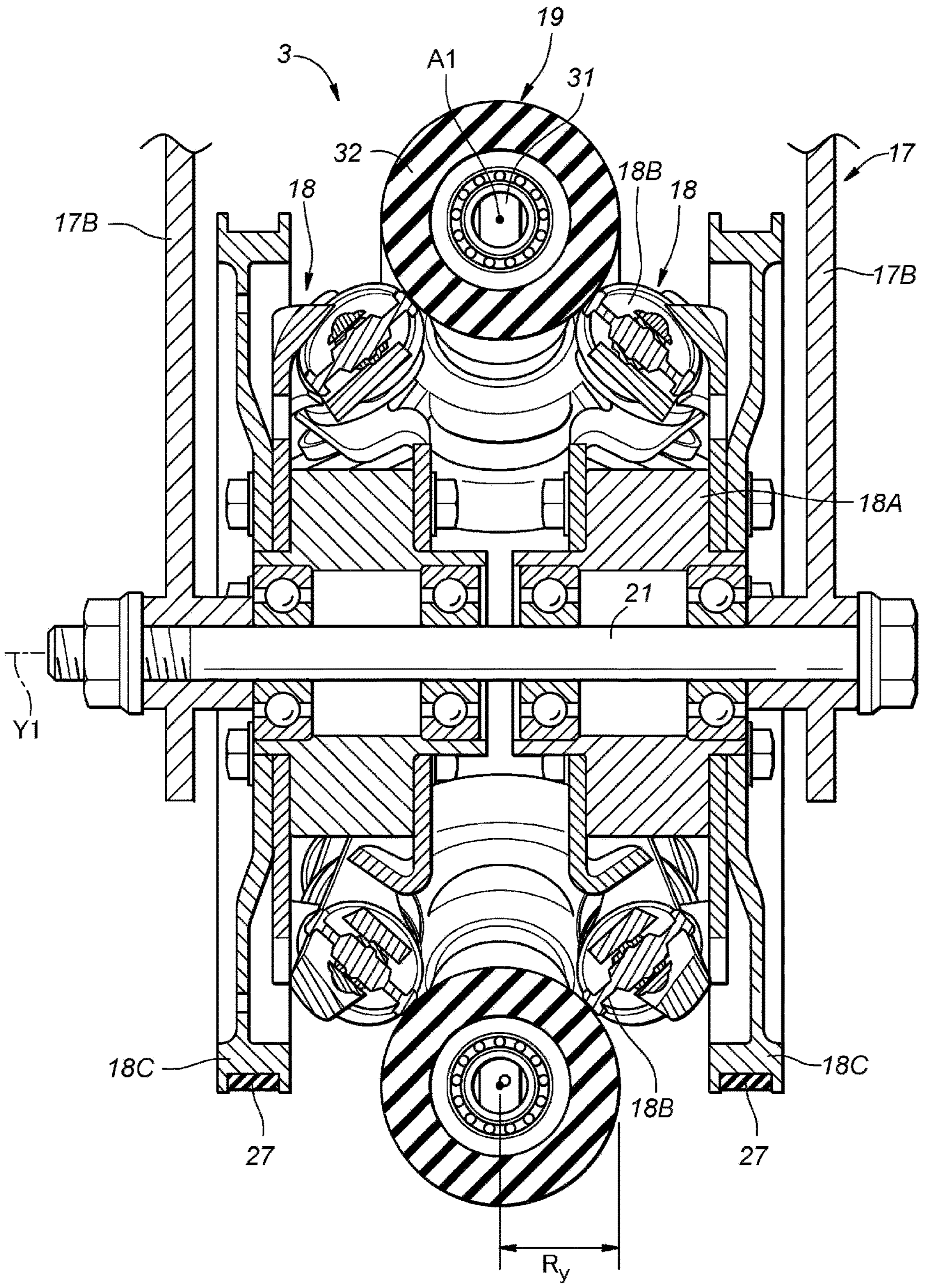
FIG. 3 is a cross-sectional view of a omnidirectional wheel.

As shown in FIG. 2, the pair of left and right omnidirectional wheels 3 are disposed at intervals on the left and right. In this embodiment, the pair of omnidirectional wheels 3 are disposed at lower left and lower right of the rear part 2A of the vehicle body 2. As shown in FIG. 3, each of the omnidirectional wheels 3 includes a frame 17, a pair of drive disks 18 rotatably supported by the frame 17, an annular main wheel 19 disposed between the pair of drive disks 18, and a pair of electric motors 20 (not shown) that rotate each of the drive disks 18.

As shown in FIGS. 1 and 3, the frame 17 includes a frame upper part 17A coupled to a lower part of the vehicle body 2, and a pair of frame side parts 17B extending downward from both left and right ends of the frame upper part 17A. A support shaft 21 extending left and right is spanned between lower ends of the pair of frame side parts 17B. The pair of drive disks 18 are rotatably supported on the support shaft 21. The pair of drive disks 18 rotate around an axis Y1 of the support shaft 21. A position of each of the drive disks 18 in the left-right direction with respect to the support shaft 21 is restricted. The drive disks 18 face each other at a distance in the left-right direction.

The drive disks 18 are respectively disposed on two sides of the annular main wheel 19, and apply frictional force to the main wheel 19 to rotate the main wheel 19 around a central axis and around an annular axis. The drive disk 18 includes a disk-shaped base 18A that is rotatably supported by the frame 17, and multiple drive rollers 18B that are rotatably supported on an outer circumference of the base 18A so as to be inclined to each other and that contact the main wheel 19. The base 18A is disposed coaxially with the support shaft 21.

Driven pulleys 18C are provided on opposing surfaces of each of the drive disks 18, respectively. The driven pulley 18C is provided coaxially with the drive disk 18. The pair of electric motors 20 are provided at the lower part of the vehicle body 2. A drive pulley 26 is provided on an output shaft of each of the electric motors 20. The corresponding drive pulley 26 and driven pulley 18C are connected by a belt 27. As each of the electric motors 20 rotates independently of each other, each of the drive disks 18 rotates independently of each other.

Figure 4:
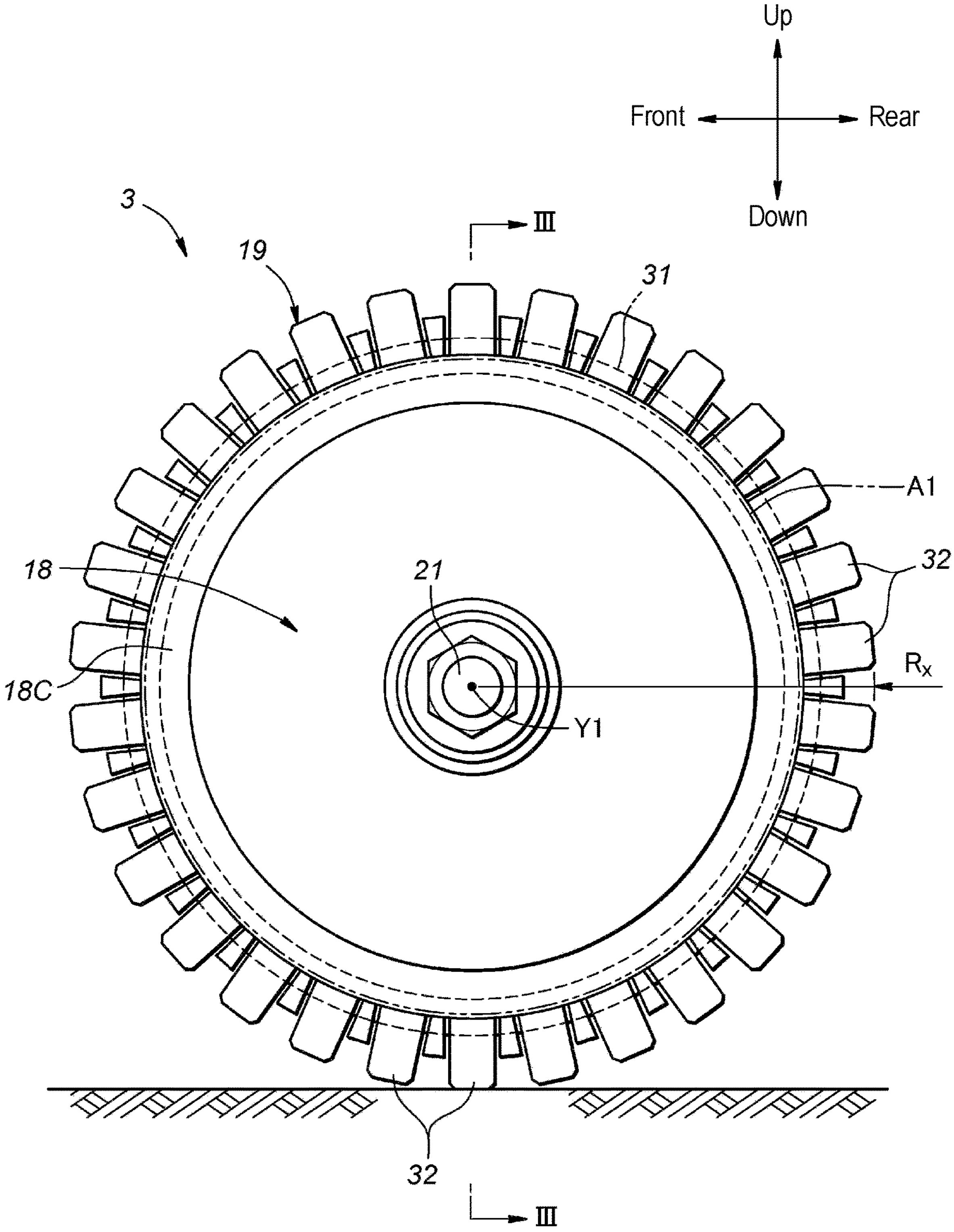
FIG. 4 is a side view of a main wheel.

As shown in FIG. 4, the main wheel 19 has an annular shape, is disposed coaxially with the drive disk 18 between the pair of drive disks 18, contacts the multiple drive rollers 18B, and is rotatable around the central axis and around the annular axis. The main wheel 19 has a circular core body 31 and multiple driven rollers 32 rotatably supported by the core body 31. The multiple driven rollers 32 are arranged at equal intervals in a circumferential direction of the core body 31. Each of the driven rollers 32 is supported by the core body 31 so as to be rotatable around an axis A1 (annular axis) of the annular core body 31. Each of the driven rollers 32 may rotate around a tangent line of the core body 31 at its respective position with respect to the core body 31. Each of the driven rollers 32 rotates relative to the core body 31 in response to an external force.

The main wheel 19 is disposed along an outer periphery of the pair of drive disks 18 and is in contact with the multiple drive rollers 18B provided on each of the drive disks 18. The drive rollers 18B of each of the drive disks 18 contact an inner periphery of the main wheel 19 and sandwich the main wheel 19 from the left and right sides. Further, the drive rollers 18B of the left and right drive disks 18 contact the inner periphery of the main wheel 19 to restrict displacement of the drive disk 18 in the radial direction around the axis Y1. Thereby, the main wheel 19 is supported by the left and right drive disks 18, and the central axis of the main wheel 19 (core body 31) is disposed coaxially with the axis Y1 of the left and right drive disks 18. The main wheel 19 contacts the multiple drive rollers 18B of the left and right drive disks 18 at the multiple driven rollers 32.

Figure 5:
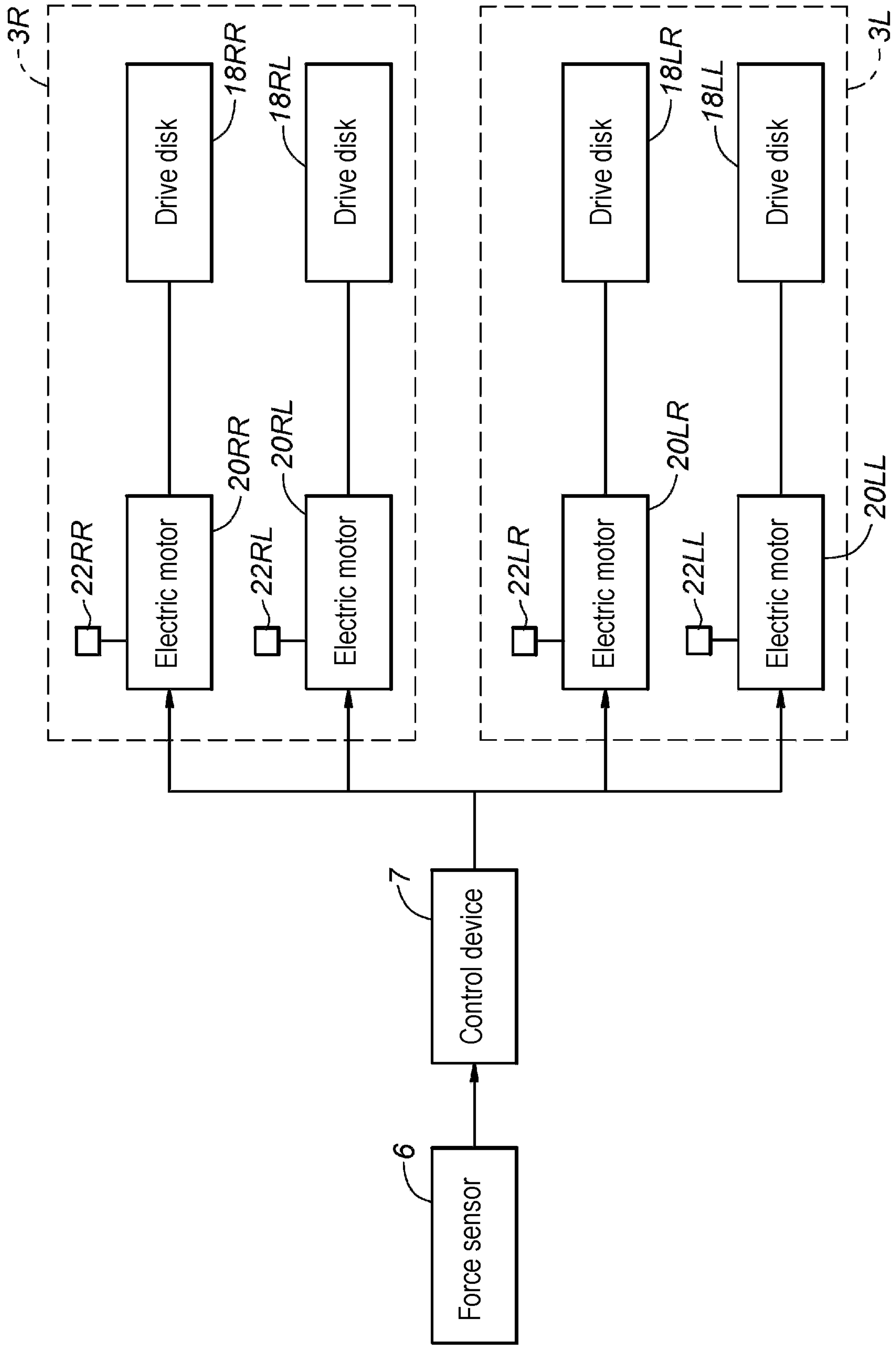
FIG. 5 is a block view showing a control device for a moving body.

In this embodiment, as shown in FIG. 5, a left omnidirectional wheel 3L has a left electric motor 20LL and a right electric motor 20LR, and a right omnidirectional wheel 3R has a left electric motor 20RL and a right electric motor 20RR. Each of the electric motors 20RR, 20RL, 20LR, 20LL is provided with a rotation angle sensor 22RR, 22RL, 22LR, 22LL that detects a rotation angle of each of the electric motors 20RR, 20RL, 20LR, 20LL.

In each of the omnidirectional wheels 3, when the pair of drive disks 18 rotate in the same direction and at the same rotation speed, the main wheel 19 rotates together with the pair of drive disks 18. That is, the main wheel 19 rotates forward or backward around its own rotational axis that coincides with the axis Y1. At this time, the drive rollers 18B of the drive disk 18 and the driven rollers 32 of the main wheel 19 do not rotate relative to the core body 31. In each of the omnidirectional wheels 3, if a rotation speed difference occurs between the pair of drive disks 18, in response to a force in the circumferential (tangential) direction caused by the rotation of the pair of drive disks 18, a component force in a direction perpendicular to this force acts on the driven rollers 32 of the main wheel 19 from the left and right drive rollers 18B. Since the axis of the drive roller 18B is inclined with respect to a circumferential direction of the drive roller 18B, a component force is generated between the drive disks 18 due to the rotation speed difference. Due to this component force, the drive rollers 18B rotate with respect to the base 18A, and the driven rollers 32 rotate with respect to the core body 31. Thereby, the main wheel 19 generates a driving force in the left-right direction.

The left and right omnidirectional wheels 3 rotate forward at the same speed, whereby the moving body 1 moves forward. The left and right omnidirectional wheels 3 rotate backward at the same speed, whereby the moving body 1 moves backward. The speed generated in the rotation of the left and right omnidirectional wheels 3 in the front-rear direction cases the moving body 1 to turn to the right or left. The rotation of the driven rollers 32 of each of the main wheels 19 of the left and right omnidirectional wheels 3 causes the moving body 1 to move in parallel to the right or left.

As shown in FIGS. 1 and 2, a handle holder 35 that protrudes upward is provided at the upper part of the rear part 2A of the vehicle body 2. The handle 5 is supported on the handle holder 35 via the force sensor 6. The force sensor 6 may be a tri-axial force sensor that detects loads along two axes perpendicular to each other on a horizontal plane and a moment around a vertical axis (z-axis). In this embodiment, the force sensor 6 detects a front-rear load which is a load in the front-rear direction (x-axis) applied to the handle 5, a left-right load which is a load in the left-right direction (y-axis), and a moment around the vertical axis (z-axis). The force sensor 6 has a main body and an input part provided in the main body. The main body is coupled to the handle holder 35.

The handle 5 has a horizontal part 5A extending left and right, and a pair of vertical parts 5B extending forward from the left and right ends of the horizontal part 5A. A central part of the horizontal part 5A in the left-right direction is coupled to the input part of the force sensor 6.

As shown in FIG. 2, when the user applies an external force fh and a moment mhz to a position rh of the handle 5, the force sensor 6 detects a detected force fs and a detected moment msz at a position rs of the sensor. The detected force fs includes a front-rear load, which is a front-rear component, and a left-right load, which is a left-right component.

The control device 7 is an electronic control unit (ECU) that includes a processor such as a CPU, a nonvolatile memory (ROM), a volatile memory (RAM), and the like. The control device 7 controls each of the omnidirectional wheels 3 by performing arithmetic processing in accordance with a program stored in the non-volatile memory in the processor. The control device 7 may be configured as one piece of hardware, or may be configured as a unit consisting of multiple pieces of hardware. Further, at least a part of each functional unit of the control device 7 may be realized by hardware such as an LSI, an ASIC, or an FPGA, or may be realized by a combination of software and hardware.

As shown in FIG. 5, the control device 7 is connected to the force sensor 6 and each of the omnidirectional wheels 3. The force sensor 6 outputs a detection signal to the control device 7. The control device 7 outputs a control signal to each of the omnidirectional wheels 3.

The control device 7 controls each of the omnidirectional wheels 3 based on the signal from the force sensor 6. The force sensor 6 is interposed between the vehicle body 2 and the handle 5. The force sensor 6 detects the magnitude and direction of an operating force (load) applied to the handle 5 by the user. Based on the signal from the force sensor 6, the control device 7 determines a target forward/backward speed, a target left/right speed, and a target angular speed of the moving body 1, and sets a control amount of each of the electric motors 20 of each of the omnidirectional wheels 3 based on the target forward/backward speed, the target left/right speed, and the target angular speed. The control device 7 sets respective target rotation speeds of the electric motors 20 based on the target forward/backward speed, the target left/right speed, and the target angular speed. Then, the control device 7 may control the current supplied to each of the electric motors 20 such that the rotational speed of each of the electric motors 20 becomes the target rotation speed.

Next, a calibration method for the moving body 1 will be explained. Since the moving direction of the moving body 1 is determined by four electric motors 20, there is a possibility that the moving direction of the moving body 1 is deviated according to individual difference of each of the electric motors 20, individual difference of the transmission mechanism from each of the electric motors 20 to the corresponding drive disk 18, contact state of each of the drive disks 18 with the main wheel 19, and the like. The purpose of the calibration method is to reduce deviations in the moving direction of the moving body 1.

The calibration method is based on the following idea. The theoretical relationship between motor rotation speeds ωrr, ωrl, ωlr, ωll of each of the electric motors 20RR, 20RL, 20LR, 20LL and moving speeds vx, vy, vz of the moving body 1 is as shown in Equation (1) below.

[Equation 1]

$$\begin{bmatrix} v_x \\ v_y \\ w_z \end{bmatrix} = \begin{bmatrix} \frac{\pi R_x}{120 G_r W_{hx}}(-\omega_{rr} - \omega_{rl} + \omega_{lr} + \omega_{ll}) \\ \frac{\pi R_y}{120 G_r W_{hy}}(\omega_{rr} - \omega_{rl} - \omega_{lr} + \omega_{ll}) \\ \frac{\pi R_x}{60 G_r W_{hx} L}(-\omega_{rr} - \omega_{rl} - \omega_{lr} - \omega_{ll}) \end{bmatrix} \tag{1}$$

Here, vx is a forward-backward moving speed [m/s], vy is a lateral moving speed [m/s], vz is a yaw rotation speed [rad/s], Gr is a speed ratio from each of the drive disks 18 to the corresponding electric motor 20, Whx is a speed ratio from the main wheel 19 to the drive disk 18, Why is a speed ratio from the driven roller 32 to the drive disk 18, Rx is a radius [m] of the main wheel 19, ry is a radius [m] of the driven roller 32, and L is a tread length [m]. As shown in FIG. 4, an outer periphery of the main wheel 19 is formed by the multiple driven rollers 32, and the radius Rx of the main wheel 19 is a distance between the outer periphery of the main wheel 19 and the axis Y1. As shown in FIG. 2, the tread length L is a distance between the left and right omnidirectional wheels 3L and 3R in the left-right direction.

Equation (1) represents the theoretical relationship between the motor rotation speeds ωrr, ωrl, ωlr, ωll and the moving speeds vx, vy, vz of the moving body 1, but in reality there are deviations between nominal and actual values of the speed ratio, the radius Rx of the main wheel 19, radius Ry of the driven roller 32, and the tread length L, and deviations also occur between a command value and an actual value due to backlash or the like in the rotational speed of each of the electric motors 20.

When the command value of the electric motor 20 is 0, the actual value of the electric motor 20 is 0, so a mapping f of the command value and the actual value satisfies the following Equation (2).

[Equation 2]

$$f(0) = 0 \tag{2}$$

The following Equation (3) is assumed as a mapping that satisfies Equation (2).

[Equation 3]

$$f(\omega \ldots) = \alpha \ldots \omega \ldots \tag{3}$$

$$(\alpha \ldots > 0)$$

Here, a suffix "..." represents rr, rl, lr, ll, ω ... represents the rotation speed (ωrr, ωrl, ωlr, ωll) of each of the electric motors 20, and a ... represents correction coefficients (αrr, αrl, αlr, αll) corresponding to each of the electric motors 20.

When only the deviation in the rotation speed of each of the electric motors 20 is taken into consideration, the actual value of the moving speed is expressed as in Equation (3) to Equation (4)

[Equation 4]

$$\begin{bmatrix} \hat{v}_x \\ \hat{v}_y \\ \hat{w}_z \end{bmatrix} = \begin{bmatrix} \frac{\pi R_x}{120 G_r W_{hx}}(-\alpha_{rr}\omega_{rr} - \alpha_{rl}\omega_{rl} + \alpha_{lr}\omega_{lr} + \alpha_{ll}\omega_{ll}) \\ \frac{\pi R_y}{120 G_r W_{hy}}(\alpha_{rr}\omega_{rr} - \alpha_{rl}\omega_{rl} - \alpha_{lr}\omega_{lr} + \alpha_{ll}\omega_{ll}) \\ \frac{\pi R_x}{60 G_r W_{hx} L}(-\alpha_{rr}\omega_{rr} - \alpha_{rl}\omega_{rl} - \alpha_{lr}\omega_{lr} - \alpha_{ll}\omega_{ll}) \end{bmatrix} \tag{4}$$

Here, vx^ is an actual value of the forward-backward moving speed [m/s], vy^ is an actual value of the lateral moving speed [m/s], and vz^ is an actual value of the yaw rotation speed [rad/s]. ^ represents a hat.

Further, considering deviations in the speed ratio or the like, the actual value of the moving speed is expressed as in Equation (5).

[Equation 5]

$$\begin{bmatrix} \hat{v}_x \\ \hat{v}_y \\ \hat{w}_z \end{bmatrix} = \begin{bmatrix} -\beta_{11}\sum\omega_{rr} - \beta_{12}\omega_{rl} + \beta_{13}\omega_{lr} + \beta_{14}\omega_{ll} \\ \beta_{21}\sum\omega_{rr} - \beta_{22}\omega_{rl} + \beta_{23}\omega_{lr} + \beta_{24}\omega_{ll} \\ -\beta_{31}\sum\omega_{rr} - \beta_{32}\omega_{rl} + \beta_{33}\omega_{lr} + \beta_{34}\omega_{ll} \end{bmatrix} \tag{5}$$

$$(\beta \ldots > 0)$$

Here, β ... is a correction coefficient that incorporates α ... for deviations in speed ratio or the like.

When the moving speed is integrated and converted into a position and an angle, it is expressed as in Equation (6).

[Equation 6]

$$\begin{bmatrix} \hat{x} \\ \hat{y} \\ \hat{\theta} \end{bmatrix} = \begin{bmatrix} -\beta_{11}\sum\omega_{rr}\Delta t - \beta_{12}\sum\omega_{rl}\Delta t + \beta_{13}\sum\omega_{lr}\Delta t + \beta_{14}\sum\omega_{ll}\Delta t \\ \beta_{21}\sum\omega_{rr}\Delta t - \beta_{22}\sum\omega_{rl}\Delta t + \beta_{23}\sum\omega_{lr}\Delta t + \beta_{24}\sum\omega_{ll}\Delta t \\ -\beta_{31}\sum\omega_{rr}\Delta t - \beta_{32}\sum\omega_{rl}\Delta t + \beta_{33}\sum\omega_{lr}\Delta t + \beta_{34}\sum\omega_{ll}\Delta t \end{bmatrix} = \begin{bmatrix} -\beta_{11}\Omega_{rr} - \beta_{12}\Omega_{rl} + \beta_{13}\Omega_{lr} + \beta_{14}\Omega_{ll} \\ \beta_{21}\Omega_{rr} - \beta_{22}\Omega_{rl} - \beta_{23}\Omega_{lr} + \beta_{24}\Omega_{ll} \\ -\beta_{31}\Omega_{rr} - \beta_{32}\Omega_{rl} - \beta_{33}\Omega_{lr} - \beta_{34}\Omega_{ll} \end{bmatrix} \tag{6}$$

Here, Ω ... is Σω ... Δt, which represents a total number of rotations of each of the electric motors 20.

Here, in order for Equation (6) to hold, the movement of the moving body 1 must be only translational movement or only rotational movement (ultra-pivotal turn). However, as described above, since deviations occur in the movement of the moving body 1, it is difficult to limit the movement of the moving body 1 to only translational movement or rotational movement (ultra-pivotal turn). However, for a yaw angle θ, Equation (6) holds true. Thus, the yaw rotation angle speed in Equation (4) may be expressed as in Equation (7).

[Equation 7]

$$\hat{\theta} = \frac{\pi R_x}{60 G_r W_{hx} L}\left(-\alpha_{rr}\sum\omega_{rr}\Delta t - \alpha_{rl}\sum\omega_{rl}\Delta t - \alpha_{lr}\sum\omega_{lr}\Delta t - \alpha_{ll}\sum\omega_{ll}\Delta t\right) = \frac{\pi R_x}{60 G_r W_{hx} L}(-\alpha_{rr}\Omega_{rr} - \alpha_{rl}\Omega_{rl} - \alpha_{ll}\Omega_{lr} - \alpha_{ll}\Omega_{ll}) \tag{7}$$

In order to obtain an estimation amount α . . . ~ of the correction coefficient α . . . in Equation (7), it is necessary to obtain time series data of a rotational speed command value ω . . . of each of the electric motors 20, and measure an actual value θ^ of the yaw angle. Thus, the control device 7 may generate a translational movement command or an ultra-pivotal turn command, and perform a task of measuring the total number of rotations and the actual value θ^ of the yaw angle of each of the electric motors 20 multiple times. A good way to calculate an optimal value (estimation amount) is to solve the normal equation in the multiple regression of Equation (7) using the Lagrange undetermined multiplier method with the condition α . . . >0.

In order to collect data for solving the Equation (7), the above task is performed n times and n pieces of data are obtained. When the Equation (7) is compiled with pieces of data, it becomes the Equation (8).

[Equation 8]

$$\begin{bmatrix}\hat{\theta}_1\\ \hat{\theta}_2\\ \vdots\\ \hat{\theta}_n\end{bmatrix} = -\frac{\pi R_x}{60 G_r W_{hx} L}\begin{bmatrix}\Omega_{rr1} & \Omega_{rl1} & \Omega_{lr1} & \Omega_{ll1}\\ \Omega_{rr2} & \Omega_{rl2} & \Omega_{lr2} & \Omega_{ll2}\\ \vdots & \vdots & \vdots & \vdots\\ \Omega_{rrn} & \Omega_{rln} & \Omega_{lrn} & \Omega_{lln}\end{bmatrix}\begin{bmatrix}\alpha_{rr}\\ \alpha_{rl}\\ \alpha_{lr}\\ \alpha_{ll}\end{bmatrix} = -\frac{\pi R_x}{60 G_r W_{hx} L}\Omega\alpha \tag{8}$$

Here, the suffix of the actual value θ^ of the yaw angle represents the n-th data. Further, the third suffix from the left of a total number of rotations 22 of each of the electric motors 20 represents the n-th data.

From Equation (8), the estimation amount α . . . ~ of the correction coefficient α . . . is expressed as in Equation (9).

[Equation 9]

$$\tilde{\alpha} = -\frac{60 G_r W_{hx} L}{\pi R_x}(\Omega^T\Omega)^{-1}\Omega^T\hat{\theta} \tag{9}$$

In order for a left pseudo inverse matrix (ΩTΩ)−1ΩT to exist, rankΩ must be 4 (number of columns). However, each data is under the constraint condition of the Equation (10) that the left and right omnidirectional wheels 3 have the same lateral speed, and one of the column vectors of Ω is linearly dependent.

[Equation 10]

$$\Omega_{rr} - \Omega_{rl} + \Omega_{lr} - \Omega_{ll} = 0 \tag{10}$$

Thus, rankΩ≤3, and the left pseudo inverse matrix (ΩTΩ)−1ΩT does not exist.

Thus, assuming that αlr and αll are equal to γ(αlr=αll=γ), Equation (8) was transformed into Equation (11).

[Equation 11]

$$\begin{bmatrix}\hat{\theta}_1\\ \hat{\theta}_2\\ \vdots\\ \hat{\theta}_n\end{bmatrix} = -\frac{\pi R_x}{60 G_r W_{hx} L}\begin{bmatrix}\Omega_{rr1} & \Omega_{rl1} & \Omega_{lr1}+\Omega_{ll1}\\ \Omega_{rr2} & \Omega_{rl2} & \Omega_{lr2}+\Omega_{ll2}\\ \vdots & \vdots & \vdots\\ \Omega_{rrn} & \Omega_{rln} & \Omega_{lrn}+\Omega_{lln}\end{bmatrix}\begin{bmatrix}\alpha_{rr}\\ \alpha_{rl}\\ \gamma\end{bmatrix} \tag{11}$$

As a result, since the number of columns of the coefficient matrix and the rank match, αrr, αrl, γ (γ=αlr=αll) may be calculated based on the total number of rotations Ω . . . of each of the electric motors 20 and the actual value θ^ of the yaw angle. Similarly, assuming that αrr and αrl are equal, or assuming that αrr and αll are equal, alternatively, even if it is assumed that αrl and αlr are equal, the number of columns of the coefficient matrix and the rank match, so three correction coefficients may be calculated.

Below, a calibration method for the moving body 1 will be described, assuming that αlr and αll are equal to γ (αlr−αll=γ). The calibration method includes a first step of creating a rotational speed command value for the four electric motors 20 such that the moving body 1 performs a linear translational movement or makes an ultra-pivotal turn; a second step of driving each of the electric motors 20 based on the rotational speed command value to move the moving body 1; a third step of obtaining the total number of rotations of each of the electric motors 20 until the movement of the moving body 1 is completed; a fourth step of measuring an yaw angle change amount of the moving body 1 as the moving body 1 moves; a fifth step of repeating the first to fourth steps at least three times to obtain three or more data sets including the total number of rotations of each of the electric motors 20 and the yaw angle change amount; a sixth step of respectively calculating, based on the three or more data sets as well as a model that specifies a relationship between the total number of rotations of each of the electric motors 20, the amount change in yaw angle change, and the correction value of the rotational speed command value set corresponding to each of the electric motors 20, the correction value; and a seventh step of correcting the corresponding rotational speed command value based on the respective correction value.

The three or more data sets include the data set corresponding to at least three patterns of the translational movement with different moving directions, or at least two patterns of the translational movement and ultra-pivotal turn with different moving directions. The moving direction may include, for example, at least three patterns of the translational movement: forward (translation in the forward direction), lateral translation (translation in the lateral direction), and diagonally forward translation. The diagonally forward translation may be at any angle with respect to the front, and may be, for example, 45 degrees. Further, the moving direction may include at least two patterns of translational movement among forward, lateral translation, and diagonally forward translation, and an ultra-pivotal turn at any turning angle. Further, in order to increase the number of data sets, the speed may be changed in each moving direction, and the turning angle may be changed in an ultra-pivotal turn.

The total rotation angle of each of the electric motors 20 may be obtained based on the signal from the rotation angle sensor 22 provided in each of the electric motors 20. Moreover, in other embodiments, the control device 7 may estimate the total rotation angle based on the rotation angle command value of each of the electric motors 20.

The yaw angle change amount of the moving body 1 may be obtained, for example, by actual measurement. For example, a worker may obtain the yaw angle change amount of the moving body 1 by measuring the direction of the moving body 1 after movement. Alternatively, the moving body 1 may be provided with a compass, and the change amount in the direction of the moving body 1 before and after movement may be obtained as the yaw angle change amount. Further, the moving body 1 may be provided with an Inertial Measurement Unit (IMU) or a gyro sensor, which may be used to obtain the yaw angle change amount.

The three or more data sets including the total numbers of rotations $\Omega rr$, $\Omega rl$, $\Omega lr$, $\Omega ll$ of each of the electric motors 20 and the yaw angle change amount $\theta\hat{}$ (actual value of yaw angle) are input to the model based on Equation (11), thereby outputting the correction coefficients $\alpha rr$, $\alpha rl$, $\alpha lr$ and $\alpha ll$ ($\alpha lr=\alpha ll=\gamma$).

The control device 7 corrects the rotational speed command value by multiplying the rotational speed command value of each of the electric motors 20 by the correction coefficients $\alpha rr$, $\alpha rl$, $\alpha lr$, $\alpha ll$.

Figures 6, 7:
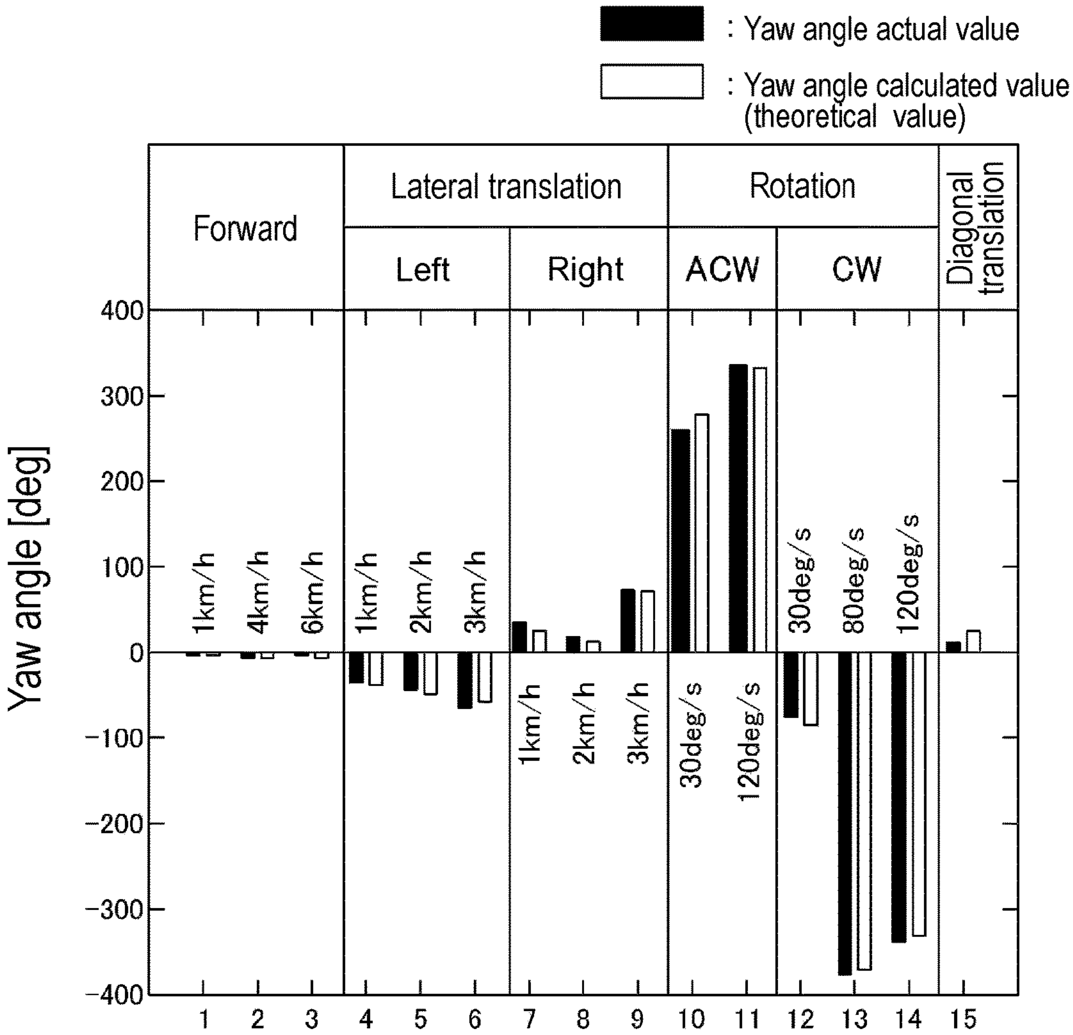
FIG. 6 is a graph showing a yaw angle of the moving body calculated from a rotational speed command value and an actual value of the yaw angle after movement, before calibration.
FIG. 7 is a table showing correction coefficients obtained by calibration and p values.

The results of calibrating the moving body 1 using the calibration method will be explained. FIG. 6 is a graph showing the yaw angle of the moving body 1 calculated from the rotational speed command value of each of the electric motors 20 and the actual value of the yaw angle after movement based on the rotational speed command value of each of the electric motors before calibration. FIG. 7 shows the results of performing the calibration method based on the data sets of FIG. 6. As shown in FIG. 7, p values of the correction coefficients $\alpha rr$, $\alpha rl$, $\gamma$ are less than 5%, which indicates that the estimation accuracy is high. Further, the root mean square error is 9.3 deg, which indicates that the estimation accuracy is high.

Figure 8:
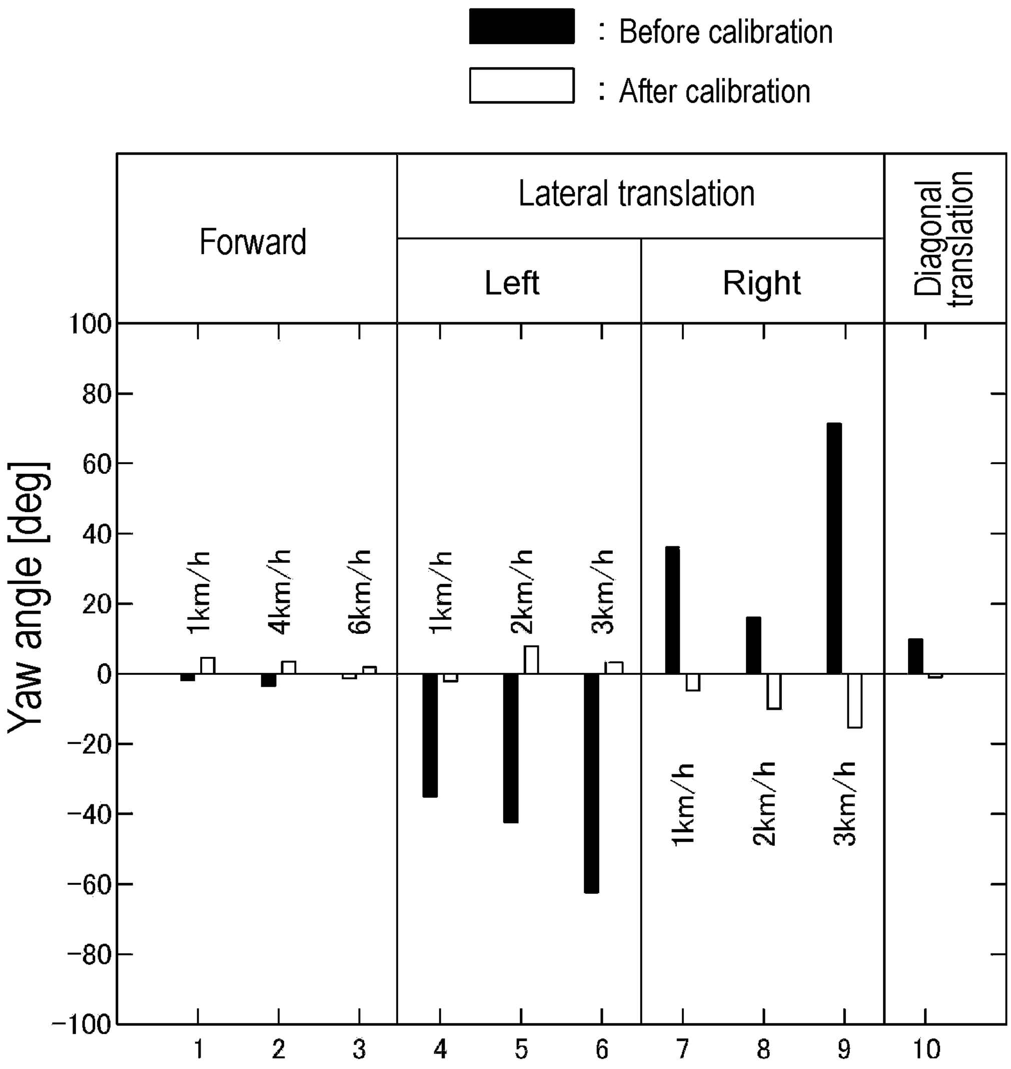
FIG. 8 is a graph showing the yaw angle of the moving body before and after calibration.

FIG. 8 is a graph showing the yaw angle of the moving body 1 before and after calibration. As shown in FIG. 8, it may be seen that by calibration, the generation of a yaw angle during linear translational movement, that is, rotation is suppressed. In particular, it may be seen that rotation during lateral translation is greatly suppressed.

Figure 9:
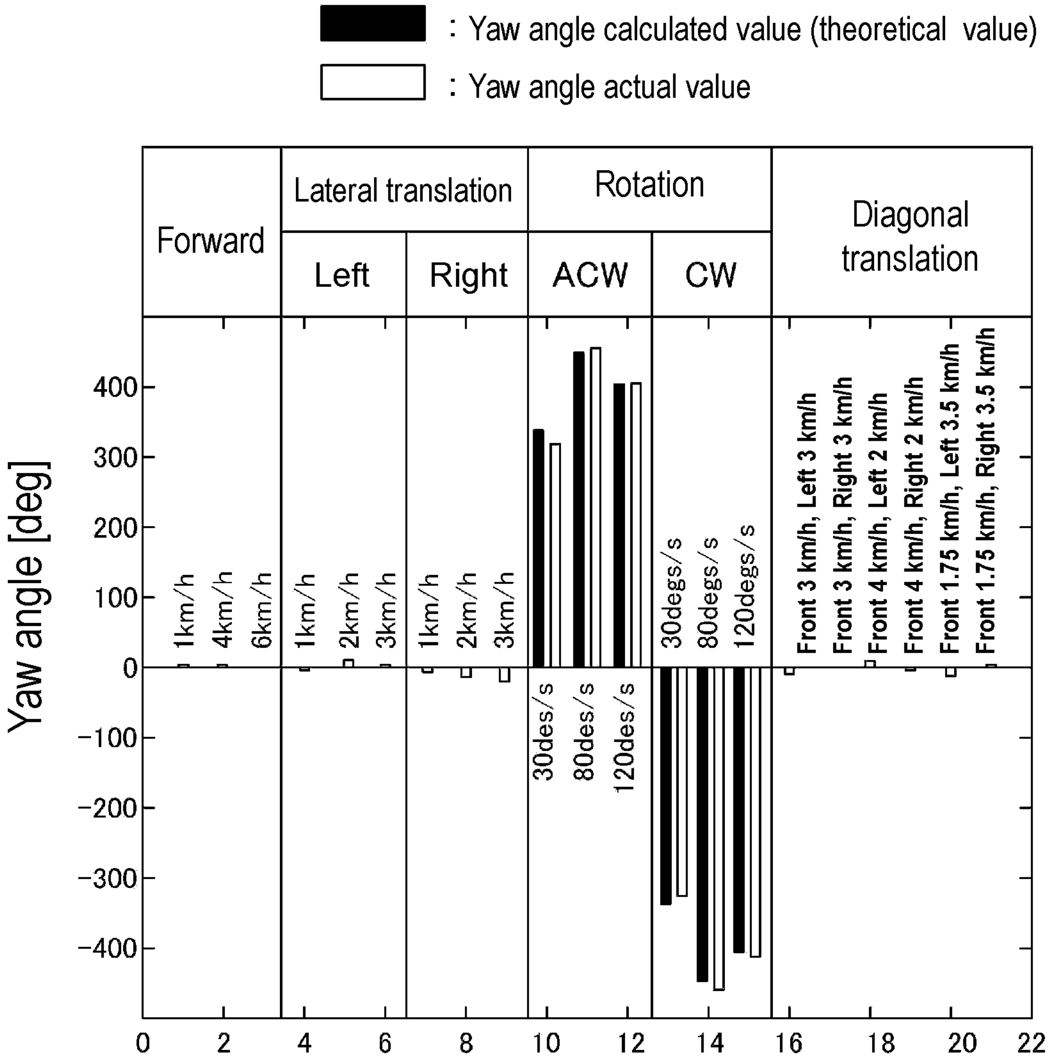
FIG. 9 is a graph showing a yaw angle of the moving body calculated from a rotational speed command value and an actual value of the yaw angle after movement after calibration.

FIG. 9 is a graph showing the yaw angle of the moving body 1 calculated from the rotational speed command value of each of the electric motors 20 and the actual value of the yaw angle after movement based on the rotational speed command value of each of the electric motors 20, after calibration. As shown in FIG. 9, it may be seen that by calibration, the generation of a yaw angle during linear translational movement, that is, rotation is suppressed. Further, since the difference between the yaw angle of the moving body 1 calculated from the rotational speed command value of each of the electric motors 20 and the actual value of the yaw angle after moving based on the rotational speed command value of each of the electric motors 20 becomes smaller, it may be seen that the behavior of the moving body 1 according to the rotational speed command value is realized.

Although the description of the specific embodiments has been completed above, the disclosure is not limited to the above-mentioned embodiments and may be widely modified and implemented. For example, in the above calibration method, the correction coefficients for the right and left electric motors 20LR and 20LL of the left omnidirectional wheel 3L are set to the same value ($\alpha lr-\alpha ll=\gamma$), but the correction coefficients for the right and left electric motors 20RR and 20RL of the right omnidirectional wheel 3R may also be set to the same value ($\alpha rr-\alpha rl=\gamma$). Further, the correction coefficients for the right electric motor 20RR of the right omnidirectional wheel 3R and the left electric motor 20LL of the left omnidirectional wheel 3L may be set to the same value ($\alpha rr-\alpha ll=\gamma$), and the correction coefficients for the left electric motor 20RL of the right omnidirectional wheel 3R and the right electric motor 20LR of the left omnidirectional wheel 3L may be set to the same value ($\alpha rl=\alpha lr=\gamma$). That is, excluding a combination of the electric motors on the same side of the left and right omnidirectional wheels, the correction coefficient (correction value) corresponding to each of any two of the electric motors 20 may be set to a same value.

What is claimed is:

1. A calibration method for a moving body, which comprises a pair of left and right omnidirectional wheels, wherein each of the omnidirectional wheels comprises a pair of drive disks, an annular main wheel disposed between the pair of drive disks, and a pair of electric motors that rotate each of the drive disks, and the main wheel comprises a circular core body, and a plurality of driven rollers rotatably supported by the core body and in contact with the pair of drive disks, the method comprising:

a first step of creating a rotational speed command value for four of the electric motors such that the moving body performs a linear translational movement or makes an ultra-pivotal turn;

a second step of driving each of the electric motors based on the rotational speed command value to move the moving body;

a third step of obtaining a total number of rotations of each of the electric motors until movement of the moving body is completed;

a fourth step of measuring a yaw angle change amount of the moving body as the moving body moves;

a fifth step of repeating the first to fourth steps at least three times to obtain three or more data sets including the total number of rotations of each of the electric motors and the yaw angle change amount;

a sixth step of respectively calculating, based on the three or more data sets as well as a model that specifies a relationship between the total number of rotations of each of the electric motors, the yaw angle change amount, and a correction value of the rotational speed command value set for each of the electric motors, the correction value;

a seventh step of correcting the corresponding rotational speed command value based on the respective correction value; and a step of driving each of the electric motors based on the corrected rotational speed command value to move the moving body.

2. The calibration method according to claim 1, wherein the three or more data sets include the data sets corresponding to at least three patterns of the translational movement with different moving directions, or at least two patterns of the translational movement with different moving directions and the ultra-pivotal turn.

3. The calibration method according to claim 2, wherein excluding a combination of the electric motors on a same side of the left and right omnidirectional wheels, the correction value corresponding to each of any two of the electric motors is set to a same value.

* * * * *